(12) United States Patent
Toma

(10) Patent No.: US 10,647,266 B2
(45) Date of Patent: May 12, 2020

(54) VEHICLE VISION SYSTEM WITH FORWARD VIEWING CAMERA

(71) Applicant: MAGNA ELECTRONICS INC., Auburn Hills, MI (US)

(72) Inventor: Tom H. Toma, Waterford, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 171 days.

(21) Appl. No.: 15/596,349

(22) Filed: May 16, 2017

(65) Prior Publication Data

US 2017/0334367 A1  Nov. 23, 2017

Related U.S. Application Data

(60) Provisional application No. 62/337,574, filed on May 17, 2016.

(51) Int. Cl.
| | |
|---|---|
| *B60R 11/04* | (2006.01) |
| *H04N 5/225* | (2006.01) |
| *H04N 7/18* | (2006.01) |
| *G06K 9/00* | (2006.01) |
| *B60R 1/00* | (2006.01) |
| *B60R 11/00* | (2006.01) |

(52) U.S. Cl.
CPC .......... *B60R 11/04* (2013.01); *G06K 9/00791* (2013.01); *H04N 5/2257* (2013.01); *H04N 7/183* (2013.01); *B60R 1/00* (2013.01); *B60R 2011/0026* (2013.01)

(58) Field of Classification Search
CPC ... B60R 11/04; B60R 2011/0026; B60R 1/00; H04N 7/183; H04N 5/2257; G06K 9/00805; G06K 9/00818; G06K 9/00798; B60Q 1/143; B60Q 9/008
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 6,004,150 A * | 12/1999 | Chapman | H01R 29/00 439/189 |
| 6,104,379 A * | 8/2000 | Petrich | G06F 3/014 345/156 |
| 6,587,575 B1 * | 7/2003 | Windham | G01N 21/31 250/458.1 |
| 6,690,268 B2 | 2/2004 | Schofield et al. | |
| 6,824,281 B2 | 11/2004 | Schofield et al. | |

(Continued)

OTHER PUBLICATIONS

Toshiba, TC358746AXBG, entire document.*
FTDI, Technical Note TN_158, Mar. 2015, FTDI, version 1.0, pp. 1-13.*

*Primary Examiner* — Joseph Suh
(74) *Attorney, Agent, or Firm* — Honigman LLP

(57) ABSTRACT

A vision system for a vehicle includes a camera disposed at a vehicle and having a field of view exterior and forward of the vehicle. The camera includes an imager and a lens. The imager captures image data. The camera includes an imager interface disposed on a circuit board that is compatible with one or both of 8-bit MIPI-CSI2 and 12-bit parallel. The imager interface is connected to an image processor that processes image data captured by the imager.

12 Claims, 3 Drawing Sheets

(56) References Cited

U.S. PATENT DOCUMENTS

| | | |
|---|---|---|
| 7,038,577 B2 | 5/2006 | Pawlicki et al. |
| 7,480,149 B2 | 1/2009 | DeWard et al. |
| 7,720,580 B2 | 5/2010 | Higgins-Luthman |
| 7,855,755 B2 | 12/2010 | Weller et al. |
| 8,256,821 B2 | 9/2012 | Lawlor et al. |
| 8,305,456 B1 * | 11/2012 | McMahon ........... H04N 5/2258 348/218.1 |
| 2004/0189862 A1 * | 9/2004 | Gustavsson ........ G02B 13/0015 348/376 |
| 2009/0295181 A1 | 12/2009 | Lawlor et al. |
| 2011/0299581 A1 * | 12/2011 | Le-Gall .......... G01R 31/318385 375/224 |
| 2012/0147209 A1 * | 6/2012 | Hiraoka ............. H04N 5/37455 348/222.1 |
| 2013/0343610 A1 * | 12/2013 | Dal Mutto ......... G06K 9/00355 382/103 |
| 2014/0160284 A1 | 6/2014 | Achenbach et al. |
| 2014/0226012 A1 | 8/2014 | Achenbach |
| 2014/0313339 A1 | 10/2014 | Diessner |
| 2014/0340510 A1 | 11/2014 | Ihlenburg et al. |
| 2015/0015713 A1 | 1/2015 | Wang et al. |
| 2015/0327398 A1 | 11/2015 | Achenbach et al. |
| 2016/0234513 A1 * | 8/2016 | Ju ........................ H04N 19/176 |
| 2016/0268716 A1 * | 9/2016 | Conger ................ H01R 12/716 |
| 2016/0280133 A1 * | 9/2016 | Salomonsson ......... B60Q 9/008 |

\* cited by examiner

FIG. 3

| MIPI Function | Parallel Function | | Parallel Function | MIPI Function |
|---|---|---|---|---|
| NC | Vcc2_IMG | 30 pin | Vcc_IMG | |
| GND | SCL | | SDA | NC |
| MIPI_D0+ | GND | | GND | GND |
| MIPI_D0− | IMG DATA0 | | IMG DATA1 | MIPI_D1+ |
| GND | IMG DATA2 | | IMG DATA3 | MIPI_D1− |
| MIPI_D2+ | IMG DATA4 | | IMG DATA5 | GND |
| MIPI_D2− | IMG DATA6 | | IMG DATA7 | MIPI_D3+ |
| NC | IMG DATA8 | | IMG DATA9 | MIPI_D3− |
| GND | IMG DATA10 | | IMG DATA 11 | NC |
| MIPI_CK+ | GND | | GND | GND |
| GND | IMG VSYNC | | IMG HSYNC | MIPI_CK− |
| NC | GND | | GND | GND |
| NC | IMG PCLK | | NC | NC |
| GND | IMG MCLK | | NC | NC |
| | GND | | IMG RST | IMG RST |

VEHICLE VISION SYSTEM WITH FORWARD VIEWING CAMERA

CROSS REFERENCE TO RELATED APPLICATION

The present application claims the filing benefits of U.S. provisional application Ser. No. 62/337,574, filed May 17, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior of the vehicle, and provides a forward facing camera having the ability to use a single imager interface on the same board that is compatible with one or both of 8-bit MIPI-CSI2 and 12-bit parallel and connected to an image processing chip. The present invention provides an imager interface to the camera chip (such as an EyeQ4 or similar chip) that is capable of one or both of 8-bit MIPI-CSI2 and 12-bit parallel.

These and other objects, advantages, purposes and features of the present invention will become apparent upon review of the following specification in conjunction with the drawings.

BRIEF DESCRIPTION OF THE DRAWINGS

FIG. 3 is a schematic showing the MIPI functions and parallel functions of the camera of the present invention.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
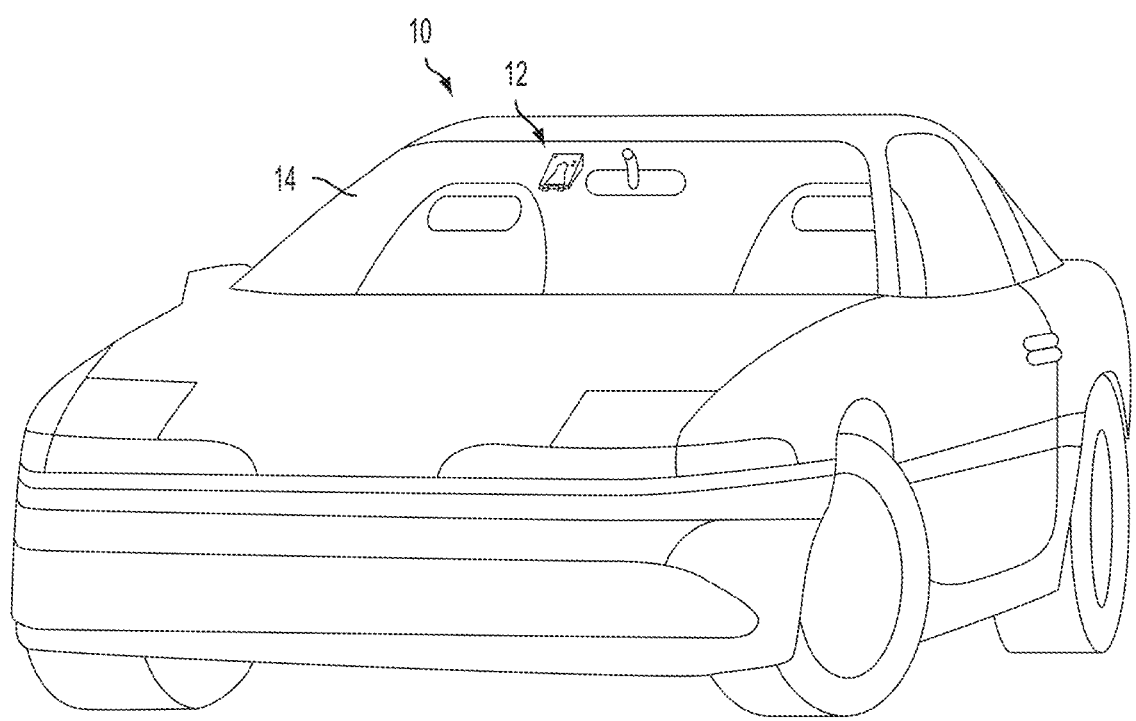
FIG. 1 is a perspective view of a vehicle with a vision system that incorporates at least a forward viewing camera in accordance with the present invention.

Referring now to the drawings and the illustrative embodiments depicted therein, a vehicle 10 includes an imaging system or vision system 12 that includes a forward viewing camera disposed at and behind a windshield 14 (FIG. 1). The forward viewing camera views through the windshield and forward of the vehicle, such as for a machine vision system (such as for traffic sign recognition, headlamp control, pedestrian detection, collision avoidance, lane marker detection and/or the like). Optionally, the vision system may include a plurality of exterior facing imaging sensors or cameras, such as a rearward facing imaging sensor or camera, a forward facing camera 14b at the front of the vehicle, and sideward/rearward facing cameras at respective sides of the vehicle. The camera or cameras which capture image data exterior of the vehicle, with the camera having a lens for focusing images at or onto an imaging array or imaging plane or imager of the camera. The vision system 12 includes a control or electronic control unit (ECU) or processor 18 that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Figure 2:
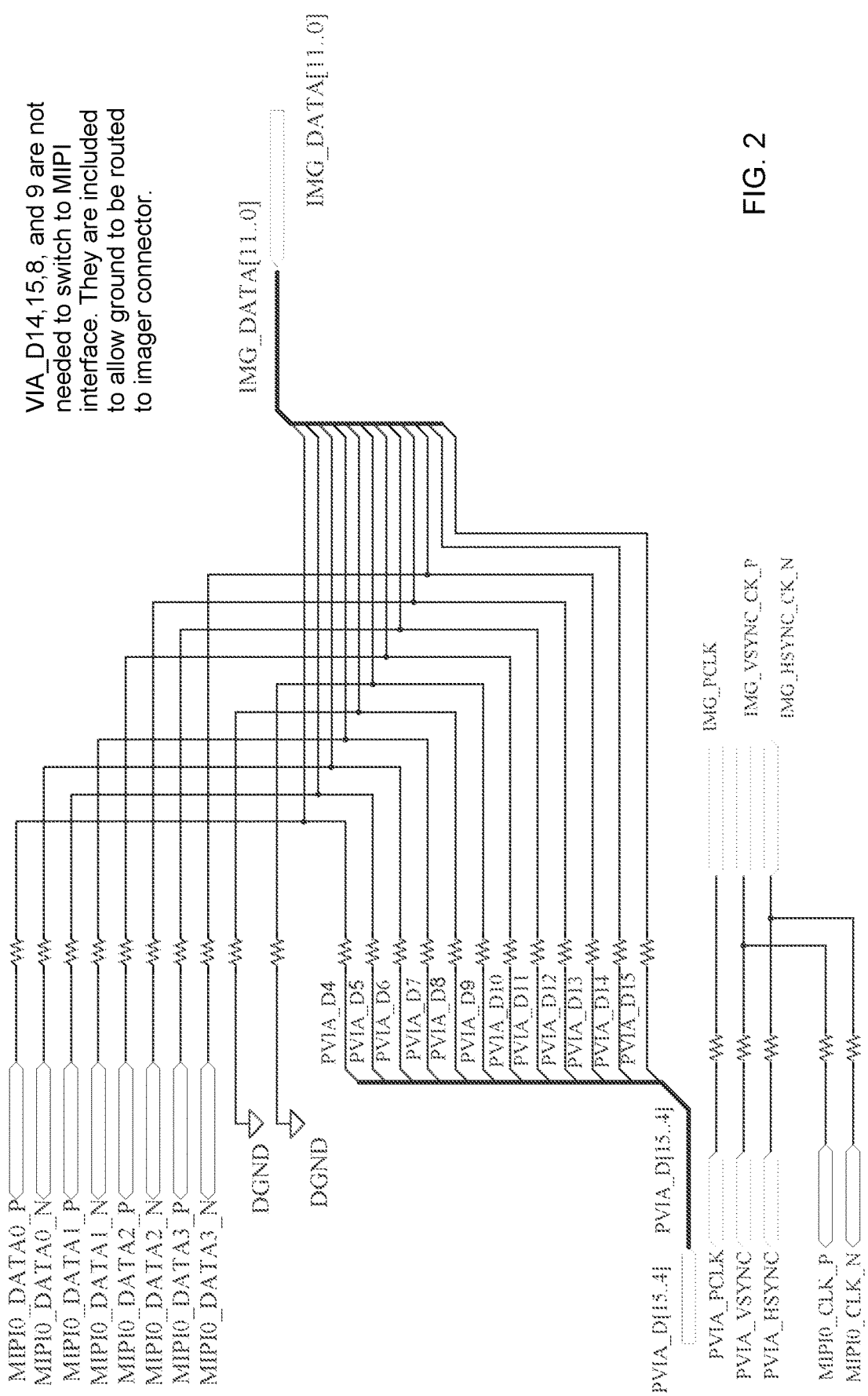
FIG. 2 is a schematic of the camera chip of the present invention.

As shown in FIGS. 2 and 3, the camera (such as the forward facing camera at the windshield of the vehicle) uses a single imager interface on the same circuit board or chip or PCB that is compatible with both 8-bit MIPI-CSI2 and 12-bit parallel and connected to an image processing chip. The present invention provides an imager interface to the camera chip (such as an EyeQ4 or similar chip) that is capable of both 8-bit MIPI-CSI2 and 12-bit parallel.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Optionally, the camera may comprise a forward facing camera, such as disposed at a windshield electronics module (WEM) or the like. The forward facing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forward, sideward or rearward directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663;

5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   a camera disposed at a vehicle and having a field of view exterior and forward of the vehicle;
   wherein said camera comprises an imager and a lens;
   wherein said imager captures image data;
   wherein said camera comprises (i) a circuit board, (ii) an imager interface disposed on said circuit board and (iii) an image processor disposed on said circuit board;
   wherein said imager interface is connected on said circuit board between said imager and said image processor of said camera, and wherein said imager interface is compatible with an 8-bit MIPI-CSI2 interface;
   wherein said image processor processes image data captured by said imager and received at said image processor via said imager interface; and
   wherein an MIPI-CSI2 compatible differential clock is routed to a VSYNC signal and an HSYNC signal.

2. The vision system of claim 1, wherein said imager interface comprises a single imager interface.

3. The vision system of claim 2, wherein said imager is disposed on said circuit board.

4. The vision system of claim 1, wherein said image processor comprises an image processing chip.

5. The vision system of claim 4, wherein said image processing chip is capable of 8-bit MIPI-CSI2.

6. The vision system of claim 1, wherein said camera comprises a forward viewing camera disposed at and viewing through a windshield of the vehicle.

7. The vision system of claim 1, wherein said image processor processes image data captured by said imager for a function selected from the group consisting of (i) traffic sign recognition, (ii) headlamp control, (iii) pedestrian detection, (iv) collision avoidance and (v) lane marker detection.

8. A vision system for a vehicle, said vision system comprising:
   a camera disposed at a windshield of a vehicle and having a field of view through the windshield and exterior and forward of the vehicle;
   wherein said camera comprises an imager and a lens;
   wherein said imager captures image data;
   wherein said camera comprises (i) a circuit board, (ii) a single imager interface disposed on said circuit board and (iii) an image processor, and wherein said single imager interface is connected on said circuit board between said imager and said image processor of said camera, and wherein said imager interface is compatible with both an 8-bit MIPI-CSI2 interface and 12-bit parallel interface;
   wherein said image processor processes image data captured by said imager and received at said image processor via said imager interface; and
   wherein an MIPI-CSI2 compatible differential clock is routed to a VSYNC signal and an HSYNC signal.

9. The vision system of claim 8, wherein said imager is disposed on said circuit board.

10. The vision system of claim 8, wherein said image processor comprises an image processing chip.

11. The vision system of claim 8, wherein at least one parallel signal unused by 8-bit MIPI-CSI2 is routed to ground.

12. The vision system of claim 8, wherein said image processor processes image data captured by said imager for a function selected from the group consisting of (i) traffic sign recognition, (ii) headlamp control, (iii) pedestrian detection, (iv) collision avoidance and (v) lane marker detection.

* * * * *